United States Patent
Yan et al.

(10) Patent No.: US 11,763,474 B2
(45) Date of Patent: *Sep. 19, 2023

(54) METHOD FOR GENERATING SIMULATED POINT CLOUD DATA, DEVICE, AND STORAGE MEDIUM

(71) Applicant: BAIDU ONLINE NETWORK TECHNOLOGY (BEIJING) CO., LTD., Beijing (CN)

(72) Inventors: Feilong Yan, Beijing (CN); Jin Fang, Beijing (CN); Tongtong Zhao, Beijing (CN); Chi Zhang, Beijing (CN); Liang Wang, Beijing (CN); Yu Ma, Beijing (CN); Ruigang Yang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 122 days.

This patent is subject to a terminal disclaimer.

(21) Appl. No.: 17/443,757

(22) Filed: Jul. 27, 2021

(65) Prior Publication Data
US 2021/0358151 A1     Nov. 18, 2021

Related U.S. Application Data

(63) Continuation of application No. 16/551,568, filed on Aug. 26, 2019, now Pat. No. 11,113,830.

(30) Foreign Application Priority Data

Aug. 30, 2018    (CN) .......................... 201811005574.2

(51) Int. Cl.
*G06T 7/521*     (2017.01)
*G06T 7/73*     (2017.01)
(Continued)

(52) U.S. Cl.
CPC .............. *G06T 7/521* (2017.01); *G06T 7/586* (2017.01); *G06T 7/73* (2017.01); *G06V 20/58* (2022.01); *G06T 2207/10028* (2013.01)

(58) Field of Classification Search
CPC ........... G06T 7/521; G06T 7/586; G06T 7/73; G06T 2207/10028; G06V 20/58
See application file for complete search history.

(56) References Cited

U.S. PATENT DOCUMENTS

2019/0179979 A1*   6/2019   Melick .................... G01P 21/02
2019/0180467 A1*   6/2019   Li ............................. G06T 7/77
(Continued)

*Primary Examiner* — Amandeep Saini
*Assistant Examiner* — Julius Chai
(74) *Attorney, Agent, or Firm* — COZEN O'CONNOR

(57) ABSTRACT

A method for generating simulated point cloud data, a device, and a storage medium includes: acquiring at least one frame of point cloud data collected by a road collecting device in an actual environment without a dynamic obstacle as static scene point cloud data; setting, least one dynamic obstacle in a coordinate system matching the static scene point cloud data; simulating in the coordinate system, a plurality of simulated scanning lights emitted by a virtual scanner located at an origin of the coordinate system; updating the static scene point cloud data according to intersections of the plurality of simulated scanning lights and the at least one dynamic obstacle to obtain the simulated point cloud data comprising point cloud data of the dynamic obstacle; and at least one of adding a set noise to the simulated point cloud data, and, deleting point cloud data corresponding to the dynamic obstacle according to a set ratio.

13 Claims, 7 Drawing Sheets

(51) Int. Cl.
*G06T 7/586* (2017.01)
*G06V 20/58* (2022.01)

(56) References Cited

U.S. PATENT DOCUMENTS

2019/0266779 A1* 8/2019 Kulkarni ................. G06T 15/04
2019/0311487 A1* 10/2019 Xiao ....................... G01S 17/89
2019/0371044 A1* 12/2019 Yu .......................... G06T 17/00

* cited by examiner

```
┌─────────────────────────────────────────────────────────────────┐
│ at least one frame of point cloud data collected by a road      │
│ collecting device in an actual environment without a dynamic    │──301
│ obstacle is acquired as static scene point cloud data           │
└─────────────────────────────────────────────────────────────────┘
                                │
                                ▼
┌─────────────────────────────────────────────────────────────────┐
│ at least one dynamic obstacle is set in a coordinate system     │
│ matching the static scene point cloud data according to set     │──302
│ position association information                                │
└─────────────────────────────────────────────────────────────────┘
                                │
                                ▼
┌─────────────────────────────────────────────────────────────────┐
│ the origin of the coordinate system is connected to each point  │
│ in the static scene point cloud data respectively to obtain a   │──303
│ plurality of line segments as actual scanning lights            │
└─────────────────────────────────────────────────────────────────┘
                                │
                                ▼
┌─────────────────────────────────────────────────────────────────┐
│ actual working parameters of the virtual scanner are simulated, │
│ and a plurality of rays starting from the origin as ideal       │──304
│ scanning lights are generated                                   │
└─────────────────────────────────────────────────────────────────┘
                                │
                                ▼
┌─────────────────────────────────────────────────────────────────┐
│ in the coordinate system, each of the ideal scanning lights is  │
│ compared with each of the actual scanning lights separately     │──305
└─────────────────────────────────────────────────────────────────┘
                                │
                                ▼
┌─────────────────────────────────────────────────────────────────┐
│ an ideal scanning light with an angle between the ideal         │
│ scanning light and an actual scanning light that is less than   │──306
│ or equal to a first angle threshold is deleted                  │
└─────────────────────────────────────────────────────────────────┘
                                │
                                ▼
┌─────────────────────────────────────────────────────────────────┐
│ combinations of remaining ideal scanning lights and the actual  │
│ scanning lights are determined as the plurality of simulated    │──307
│ scanning lights                                                 │
└─────────────────────────────────────────────────────────────────┘
                                │
                                ▼
┌─────────────────────────────────────────────────────────────────┐
│ the static scene point cloud data is updated according to       │
│ intersections of the plurality of simulated scanning lights and │
│ the at least one dynamic obstacle to obtain the simulated point │──308
│ cloud data including point cloud data of the dynamic obstacle   │
└─────────────────────────────────────────────────────────────────┘
```

Fig. 3

METHOD FOR GENERATING SIMULATED POINT CLOUD DATA, DEVICE, AND STORAGE MEDIUM

CROSS-REFERENCE TO RELATED APPLICATION

The present application is a continuation application of U.S. application Ser. No. 16/551,568, filed on Aug. 26, 2019 which is based upon and claims priority to Chinese Patent Application No. 201811005574.2, filed on Aug. 30, 2018, the entire contents of which are incorporated herein by reference.

FIELD

Embodiments of the present disclosure relate to a point cloud data processing technology, and in particular, to a method for generating simulated point cloud data, a device and a storage medium.

BACKGROUND

Point cloud data simulation is a point cloud data and computer aided design model based on target scenes. It generates high-reality virtual point cloud data technology and may be used to build large-scale scenes. For example, a variety of road scenarios are constructed for training unmanned 3D perception modules.

In general, the point cloud data simulation mainly includes three modules: generating a three-dimension scene map; simulating the state of obstacles; and simulating the working principle of the sensor. There are mainly two ways to generate the three-dimension scene map in the prior art. First, a 3D mesh model of a three-dimension static environment is manually created for performing a scene simulation, and then a virtual sensor such as a camera or a three-dimension scanner is used to synthesize a three-dimension static environment point cloud data, generating a three-dimension scene map based on the three-dimension static environment point cloud data. Secondly, a high-precision laser scanner is used to acquire high-precision and high-density 3D static environment point cloud data, and a 3D scene map is generated according to the collected 3D static environment point cloud data.

In the first method, the model is costly to produce. In a condition of the existing 3D modeling technology, it is impossible to fully create a realistic scene or a single obstacle model, and it is necessary to fully or manually automate the modeling method. Therefore, the production of large-scale scenes and models of a large number of obstacles requires high labor and material costs. In the second method, the amount of data is large, and the high-precision laser scanner is inconvenient to transport, which increases the cost of generating a three-dimension scene map. Therefore, the cost and difficulty of generating a three-dimension scene map are correspondingly increased, which increases the cost and difficulty of point cloud data simulation.

SUMMARY

According to embodiments of the present disclosure, a method for generating simulated point cloud data, a device and a storage medium are provided.

Embodiments of the present disclosure provide a method for generating simulated point cloud data. The method includes: acquiring at least one frame of point cloud data collected by a road collecting device in an actual environment without a dynamic obstacle as static scene point cloud data; setting, according to set position association information, at least one dynamic obstacle in a coordinate system matching the static scene point cloud data; simulating in the coordinate system, according to the static scene point cloud data, a plurality of simulated scanning lights emitted by a virtual scanner located at an origin of the coordinate system; and updating the static scene point cloud data according to intersections of the plurality of simulated scanning lights and the at least one dynamic obstacle to obtain the simulated point cloud data including point cloud data of the dynamic obstacle.

Embodiments of the present disclosure also provide a device, including one or more processors; a memory configured to store one or more programs, in which when the one or more programs are executed by the one or more processors, the one or more processors are caused to implement the method for generating simulated point cloud data, in which the method includes: acquiring at least one frame of point cloud data collected by a road collecting device in an actual environment without a dynamic obstacle as static scene point cloud data; setting, according to set position association information, at least one dynamic obstacle in a coordinate system matching the static scene point cloud data; simulating in the coordinate system, according to the static scene point cloud data, a plurality of simulated scanning lights emitted by a virtual scanner located at an origin of the coordinate system; and updating the static scene point cloud data according to intersections of the plurality of simulated scanning lights and the at least one dynamic obstacle to obtain the simulated point cloud data including point cloud data of the dynamic obstacle.

Embodiments of the present disclosure also provide a computer-readable storage medium having a computer program stored thereon, in which the computer program is executed by a processor to implement the method for generating simulated point cloud data, in which the method includes: acquiring at least one frame of point cloud data collected by a road collecting device in an actual environment without a dynamic obstacle as static scene point cloud data; setting, according to set position association information, at least one dynamic obstacle in a coordinate system matching the static scene point cloud data; simulating in the coordinate system, according to the static scene point cloud data, a plurality of simulated scanning lights emitted by a virtual scanner located at an origin of the coordinate system; and updating the static scene point cloud data according to intersections of the plurality of simulated scanning lights and the at least one dynamic obstacle to obtain the simulated point cloud data including point cloud data of the dynamic obstacle.

BRIEF DESCRIPTION OF THE DRAWINGS

FIG. 3 is a flowchart of a method for generating simulated point cloud data according to Embodiment 3 of the present disclosure;

DETAILED DESCRIPTION

Figure 1:
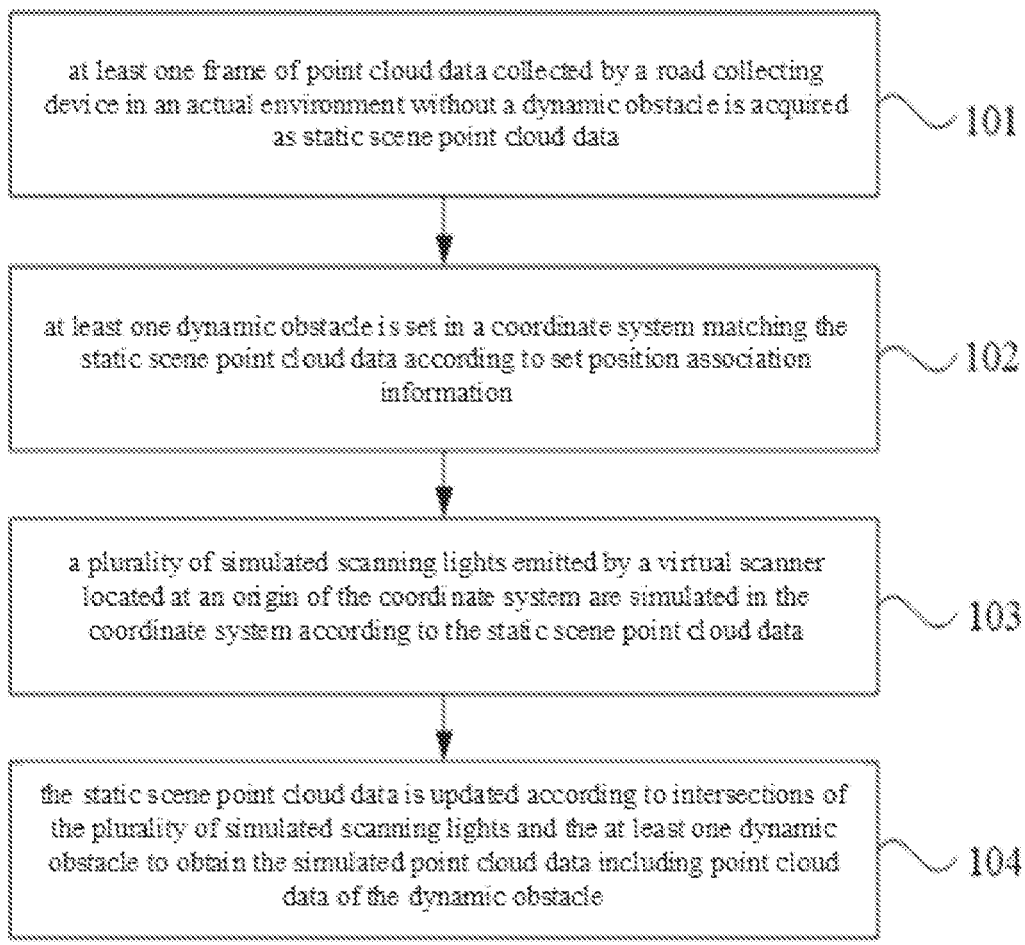
FIG. 1 is a flowchart of a method for generating simulated point cloud data according to Embodiment 1 of the present disclosure.

The present disclosure will be further described in detail below with reference to the accompanying drawings and embodiments. It is understood that the specific embodiments described herein are merely illustrative of the invention and are not intended to limit the present disclosure. It should also be noted that, for ease of description, only some, but not all, of the structures related to the present disclosure are shown in the drawings.

Embodiment 1

FIG. 1 is a flowchart of a method for generating simulated point cloud data according to Embodiment 1 of the present disclosure. The embodiment is applicable to a scenario of generating simulated point cloud data, and the method may be executed by an apparatus for generating point cloud data. The apparatus may be implemented in software and/or hardware, and the apparatus may be configured in a computer device. As shown in FIG. 1, the method specifically includes the following.

At block 101, at least one frame of point cloud data collected by a road collecting device in an actual environment without a dynamic obstacle is acquired as static scene point cloud data.

The actual environment is sampled by a three-dimensional laser scanning device, and points describing surface information of an object are obtained, and these point sets are generally referred to point cloud data.

A dynamic obstacle is a movable object in a real environment, such as a vehicle, a pedestrian. In the actual environment, when there are few dynamic obstacles, the road collecting device is drove along the road to collect a large amount of cloud data without dynamic obstacles. These point cloud data basically only include static scene point cloud data. Therefore, the point cloud data is collected by the road collecting device in the actual environment without dynamic obstacles, and the actual environment point cloud data without dynamic obstacles collected by the road collecting device is used as the static scene point cloud data to replace the three-dimension scene map.

Optionally, a three-dimension laser scanner is installed on the road collecting device, and the road collecting device is drove along the road in an actual environment without dynamic obstacles to collect the depth data of the surface of the scene, that is, the road collecting device collects point cloud data in the actual environment with no dynamic obstacles. Then, the at least one frame point cloud data collected by the road collecting device in the actual environment without dynamic obstacles is acquired as the static scene point cloud data.

The road collecting device may be an unmanned vehicle. The actual environment may be roads. The 3D laser scanner is a stereo measuring instrument that uses a laser sensor to continuously emit laser light to the surface of the object to be measured, and then the light reflected from the surface of the object is received by the laser pulse receiver, and the distance measurement of the object is realized by conversion and calculation.

At block 102, at least one dynamic obstacle is set in a coordinate system matching the static scene point cloud data according to set position association information.

The position association information is preset information for setting the dynamic obstacle in a coordinate system that matches the static scene point cloud data. According to the set position association information, the position and orientation of the vehicle in the coordinate system matching the static scene point cloud data may be determined, and the dynamic obstacle is set to the coordinate system matching the static scene point cloud data according to the position and orientation. Specifically, the computer-aided design model corresponding to the dynamic obstacle is set in a coordinate system matching the static scene point cloud data according to the position and orientation, such as a computer-aided design model for vehicles and pedestrians.

At block 103, a plurality of simulated scanning lights emitted by a virtual scanner located at an origin of the coordinate system are simulated in the coordinate system according to the static scene point cloud data.

The virtual scanner at the origin of the coordinate system collecting data comprises emitting laser rays from the origin of the coordinate system to the object and then the laser rays being returned. Therefore, a plurality of simulated scanning rays emitted by the virtual scanner located at the origin of the coordinate system may be simulated in the coordinate system according to the origin of the coordinate system and each point of the static scene point cloud data.

Optionally, the origin of the coordinate system is connected to each point in the static scene point cloud data respectively to obtain multiple line segments as the simulated scanning light.

Optionally, the origin of the coordinate system may be respectively connected to each point in the static scene point cloud data to obtain multiple line segments, and then the actual working parameters of the virtual scanner are simulated in the coordinate system to generate a plurality of rays starting from the origin, and after combining the two lights according to the angle between the two lights, the combination of the two lights is used as the simulated scanning light.

At block 104, the static scene point cloud data is updated according to intersections of the plurality of simulated scanning lights and the at least one dynamic obstacle to obtain the simulated point cloud data including point cloud data of the dynamic obstacle.

The shielding relationship between the dynamic obstacle and the static scene is determined according to the intersection of the plurality of simulated scanning rays and the at least one dynamic obstacle, and the static scene point cloud data is updated according to the shielding relationship, and the simulation point cloud data including the dynamic obstacle point cloud data is obtained.

The embodiment of the present disclosure provides a method for generating simulated point cloud data, in which point cloud data collected by a road collecting device in an actual environment without a dynamic obstacle may be determined as static scene point cloud data, and at least one dynamic obstacle is set in a coordinate system matching the static scene point cloud data according to set position association information. After that, a plurality of simulated scanning lights emitted by a virtual scanner located at an origin of the coordinate system are simulated in the coordinate system, and the static scene point cloud data may be updated according to intersections of the plurality of simulated scanning lights and the at least one dynamic obstacle to obtain the simulated point cloud data including point cloud data of the dynamic obstacle. Therefore, a three-dimension scene map does not need to be generated to perform the point cloud data simulation, thereby reducing a cost and difficulty of the point cloud data simulation.

Embodiment 2

Figure 2:
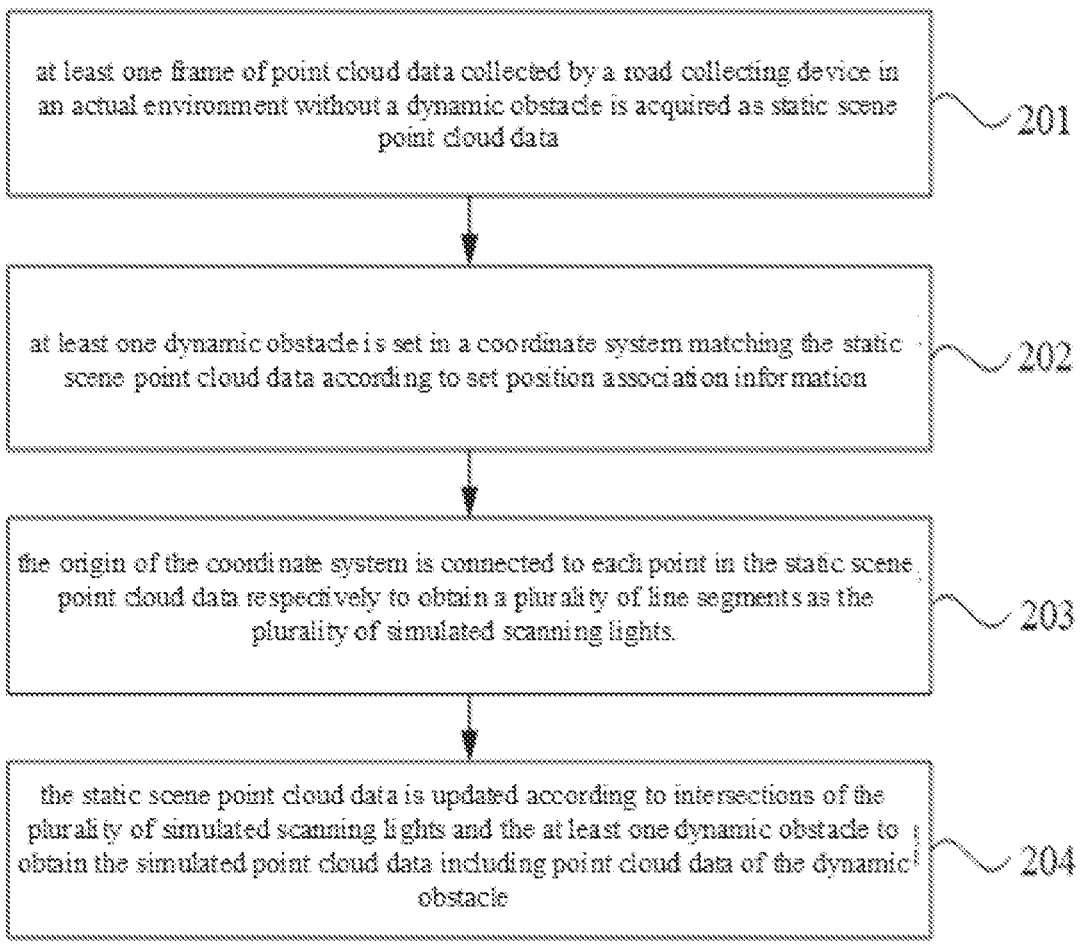
FIG. 2 is a flowchart of a method for generating simulated point cloud data according to Embodiment 2 of the present disclosure.

FIG. 2 is a flowchart of a method for generating simulated point cloud data according to Embodiment 2 of the present disclosure. The embodiment is embodied based on the foregoing embodiment. In this embodiment, simulating in the coordinate system, according to the static scene point cloud data, the plurality of simulated scanning lights emitted by the virtual scanner located at the origin of the coordinate system may include: connecting the origin of the coordinate system to each point in the static scene point cloud data respectively to obtain a plurality of line segments as the plurality of simulated scanning lights As shown in FIG. 2, the method specifically includes the following.

At block 201, at least one frame of point cloud data collected by a road collecting device in an actual environment without a dynamic obstacle is acquired as static scene point cloud data.

At block 202, at least one dynamic obstacle is set in a coordinate system matching the static scene point cloud data according to set position association information.

Optionally, the position association information comprises: position information and orientation information.

The position and orientation of the vehicle in the coordinate system matching with the static scene point cloud data may be determined according to the set position information and the orientation information, and the dynamic obstacle is set in the coordinate system matching with the static scene point cloud data according to the position and the orientation.

At block 203, the origin of the coordinate system is connected to each point in the static scene point cloud data respectively to obtain a plurality of line segments as the plurality of simulated scanning lights.

The plurality of line segments between each point in the static scene point cloud data and the origin of the coordinate system are used to simulate a plurality of simulated scanning rays emitted by the virtual scanner located at the origin of the coordinate system.

At block 204, the static scene point cloud data is updated according to intersections of the plurality of simulated scanning lights and the at least one dynamic obstacle to obtain the simulated point cloud data including point cloud data of the dynamic obstacle.

Optionally, after updating the static scene point cloud data according to intersections of the plurality of simulated scanning lights and the at least one dynamic obstacle to obtain the simulated point cloud data comprising point cloud data of the dynamic obstacle, the method further includes: adding a set noise to the simulated point cloud data, and/or, deleting point cloud data corresponding to the dynamic obstacle according to a set ratio.

The dynamic obstacle point cloud data in the simulated point cloud data may be made closer to the dynamic obstacle point cloud data collected in the actual environment by adding a set noise to the simulated point cloud data, and, deleting point cloud data corresponding to the dynamic obstacle according to a set ratio.

With the method for generating simulated point cloud data provided in embodiments of the present disclosure, the origin of the coordinate system is connected to each point in the static scene point cloud data respectively to obtain a plurality of line segments as the plurality of simulated scanning lights, such that the line segments between each point and the origin of the coordinate system simulates the simulated scanning rays emitted by the virtual scanner at the origin of the coordinate system.

Embodiment 3

FIG. 3 is a flowchart of a method for generating simulated point cloud data according to Embodiment 3 of the present disclosure. In this embodiment, simulating, according to the static scene point cloud data, the plurality of simulated scanning lights emitted by the virtual scanner located at the origin of the coordinate system in the coordinate system may include: connecting the origin of the coordinate system to each point in the static scene point cloud data respectively to obtain a plurality of line segments as actual scanning lights; simulating actual working parameters of the virtual scanner, and generating a plurality of rays starting from the origin as ideal scanning lights; comparing, in the coordinate system, each of the ideal scanning lights with each of the actual scanning lights separately; deleting an ideal scanning light with an angle between the ideal scanning light and an actual scanning light that is less than or equal to a first angle threshold; and determining a combination of remaining ideal scanning lights and the actual scanning lights as the plurality of simulated scanning lights.

As shown in FIG. 3, the method specifically includes the following:

At block 301, at least one frame of point cloud data collected by a road collecting device in an actual environment without a dynamic obstacle is acquired as static scene point cloud data.

At block 302, at least one dynamic obstacle is set in a coordinate system matching the static scene point cloud data according to set position association information.

At block 303, the origin of the coordinate system is connected to each point in the static scene point cloud data respectively to obtain a plurality of line segments as actual scanning lights.

The actual scanning lights are line segments between the origin of the coordinate system and the respective points in the static scene point cloud data.

At block 304, actual working parameters of the virtual scanner are simulated, and a plurality of rays starting from the origin as ideal scanning lights are generated.

The actual scanning lights obtained by connecting the origin of the coordinate system and the points in the static scene point cloud data is not comprehensive. If an obstacle is not encountered during a ray transmission, for example, a ray emitted by the road collecting device is parallel to the road surface to the front of the road collecting device, and there is no obstacle on the transmission path of the ray, the point cloud data will not be returned. Therefore, the ray is not included in the actual scanned ray obtained by connecting the coordinate system origin to each point in the static scene point cloud data. However, if a dynamic obstacle is placed in front of the road collecting device, the ray must be generated.

According to the actual working parameters of the virtual scanner, a plurality of rays starting from the origin may be generated as the ideal scanning light. The ideal scanning light is used to simulate the scanning light that the road collecting device actually emits in the actual environment.

At block 305, in the coordinate system, each of the ideal scanning lights is compared with each of the actual scanning lights separately.

The ideal scanning light is compared with each actual scanning light to obtain an angle between each ideal scanning light and each actual scanning light.

At block 306, an ideal scanning light with an angle between the ideal scanning light and an actual scanning light that is less than or equal to a first angle threshold is deleted.

In general, the ray that does not encounter obstacles during transmission is far from the actual scanning ray. The first angle threshold is a preset upper angle limit for determining whether the ideal scanning ray is close to the actual scanning ray.

If the angle between the ideal scanning light and the actual scanning light is less than or equal to the first angle threshold, it means that the ideal scanning light is close to the actual scanning light, and it may not be the ray without encountering an obstacle during transmission which should be added, such that the ideal scanning light is deleted.

If the angle between the ideal scanning light and the actual scanning light is greater than the first angle threshold, it means that the ideal scanning light is far from the actual scanning light, and it may be the ray without encountering an obstacle during transmission which should be added, such that the ideal scanning light is kept.

At block 307, combinations of remaining ideal scanning lights and the actual scanning lights are determined as the plurality of simulated scanning lights.

The combination of the ideal scanning ray without encountering an obstacle during transmission which should be added and the actual scanning ray is determined as the simulated scanning ray.

At block 308, the static scene point cloud data is updated according to intersections of the plurality of simulated scanning lights and the at least one dynamic obstacle to obtain the simulated point cloud data including point cloud data of the dynamic obstacle.

With the method for generating simulated point cloud data provided in embodiments of the present disclosure, the origin of the coordinate system is connected to each point in the static scene point cloud data respectively to obtain a plurality of line segments as actual scanning lights, and at the same time, actual working parameters of the virtual scanner are simulated, and a plurality of rays starting from the origin as ideal scanning lights are generated. In the coordinate system, each of the ideal scanning lights is compared with each of the actual scanning lights separately, and after that, an ideal scanning light with an angle between the ideal scanning light and an actual scanning light that is less than or equal to a first angle threshold is deleted, and combinations of remaining ideal scanning lights and the actual scanning lights are determined as the plurality of simulated scanning lights. Therefore, rays without encountering an obstacle during transmission may be supplemented to build comprehensive simulated scanning lights.

Embodiment 4

Figure 4:
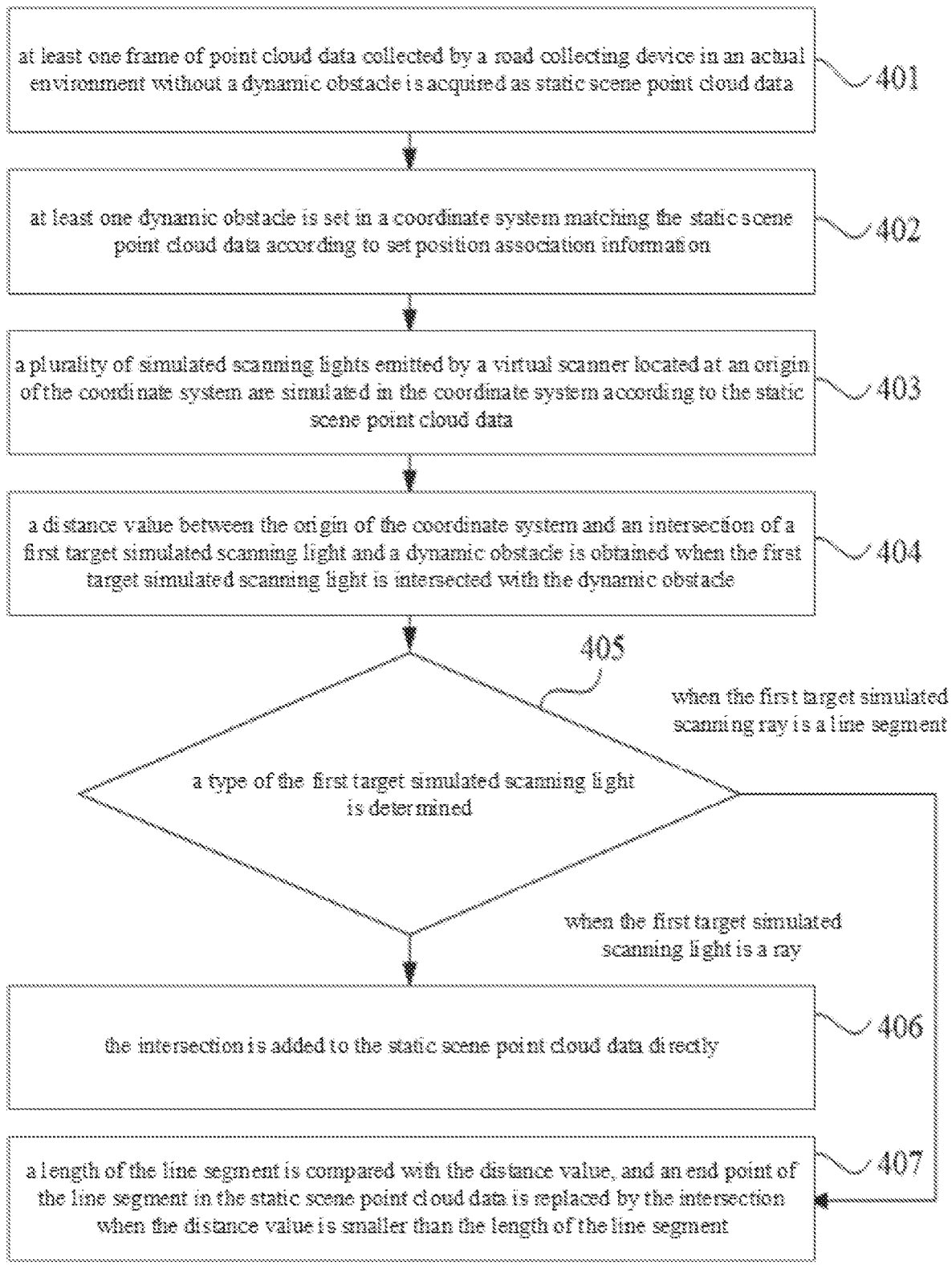
FIG. 4 is a flowchart of a method for generating simulated point cloud data according to Embodiment 4 of the present disclosure.

FIG. 4 is a flowchart of a method for generating simulated point cloud data according to Embodiment 4 of the present disclosure. The embodiment is embodied based on the foregoing embodiment. In this embodiment, updating the static scene point cloud data according to intersections of the plurality of simulated scanning lights and the at least one dynamic obstacle to obtain the simulated point cloud data comprising point cloud data of the dynamic obstacle may include: obtaining a distance value between the origin of the coordinate system and an intersection of a first target simulated scanning light and a dynamic obstacle when the first target simulated scanning light is intersected with the dynamic obstacle; adding the intersection to the static scene point cloud data directly when the first target simulated scanning light is a ray; when the first target simulated scanning light is a line segment, comparing a length of the line segment with the distance value, and replacing an end point of the line segment in the static scene point cloud data by the intersection when the distance value is smaller than the length of the line segment.

As shown in FIG. 4, the method specifically includes the following:

At block 401, at least one frame of point cloud data collected by a road collecting device in an actual environment without a dynamic obstacle is acquired as static scene point cloud data.

At block 402, at least one dynamic obstacle is set in a coordinate system matching the static scene point cloud data according to set position association information.

At block 403, a plurality of simulated scanning lights emitted by a virtual scanner located at an origin of the coordinate system are simulated in the coordinate system according to the static scene point cloud data.

At block 404, a distance value between the origin of the coordinate system and an intersection of a first target simulated scanning light and a dynamic obstacle is obtained when the first target simulated scanning light is intersected with the dynamic obstacle.

The first target simulated scanning light is a simulated scanning light generated according to the static scene point cloud data. It is determined whether the first target simulated scanning ray and the dynamic obstacle have intersections in the coordinate system according the point cloud data corresponding to the first target simulated scanning light and the point cloud data of the dynamic obstacle.

If the first target simulated scanning light is intersected with the dynamic obstacle, the distance value between the intersection point and the origin of the coordinate system according to the point cloud data corresponding to the first target simulated scanning light and the point cloud data of the dynamic obstacle.

If the first target simulated scan ray does not intersect with any of the dynamic obstacles, there is no need to update the static scene point cloud data according to the first target simulated scanning light.

At block 405, a type of the first target simulated scanning light is determined, and when the first target simulated scanning light is a ray, act in block 406 is performed; when the first target simulated scanning ray is a line segment, act in block 407 is performed.

The type of the first target simulated scanning light includes a line segment and a ray.

At block 406, the intersection is added to the static scene point cloud data directly.

When the first target simulated scanning light is a ray, the first target simulated scanning ray is a supplemental ray that does not encounter an obstacle during transmission. The first target simulates the intersection of the scanning ray with a dynamic obstacle, indicating that a new shielding relationship is generated after the dynamic obstacle is added, and the intersection point is directly added to the static scene point cloud data, thereby supplementing the shielding relationship between the dynamic obstacle and the static scene.

At block 407, a length of the line segment is compared with the distance value, and an end point of the line segment in the static scene point cloud data is replaced by the intersection when the distance value is smaller than the length of the line segment.

When the first target simulated scanning light is a line segment, the first target simulated scanning light is a simulated scanning light obtained by respectively connecting each point in the static scene point cloud data and the origin of the coordinate system. The length of the line segment is compared with the distance value. If the distance value is smaller than the length of the line segment, indicating that the dynamic obstacle forms a shielding on the static scene, the intersection point of the static scene point cloud data is replaced by the intersection point, thereby updating the shielding relationship between the dynamic obstacle and the static scene. If the distance value is greater than or equal to the length of the line segment, indicating that the dynamic obstacle does not form a shielding in the static scene, it is not necessary to update the static scene point cloud data according to the first target simulated scanning light.

With the method for generating simulated point cloud data provided in embodiments of the present disclosure, when first target simulated scanning light interacts with a dynamic obstacle, a distance value between the intersection point and the origin of the coordinate system is obtained, and then a type of the first target simulated scanning light is determined, the static scene point cloud data is updated according to the type of the first target simulated scanning light, such that the shielding relationship between the dynamic obstacle and the static scene may be further determined, and the static scene point cloud data may be updated according to the shielding relationship.

Embodiment 5

Figure 5:
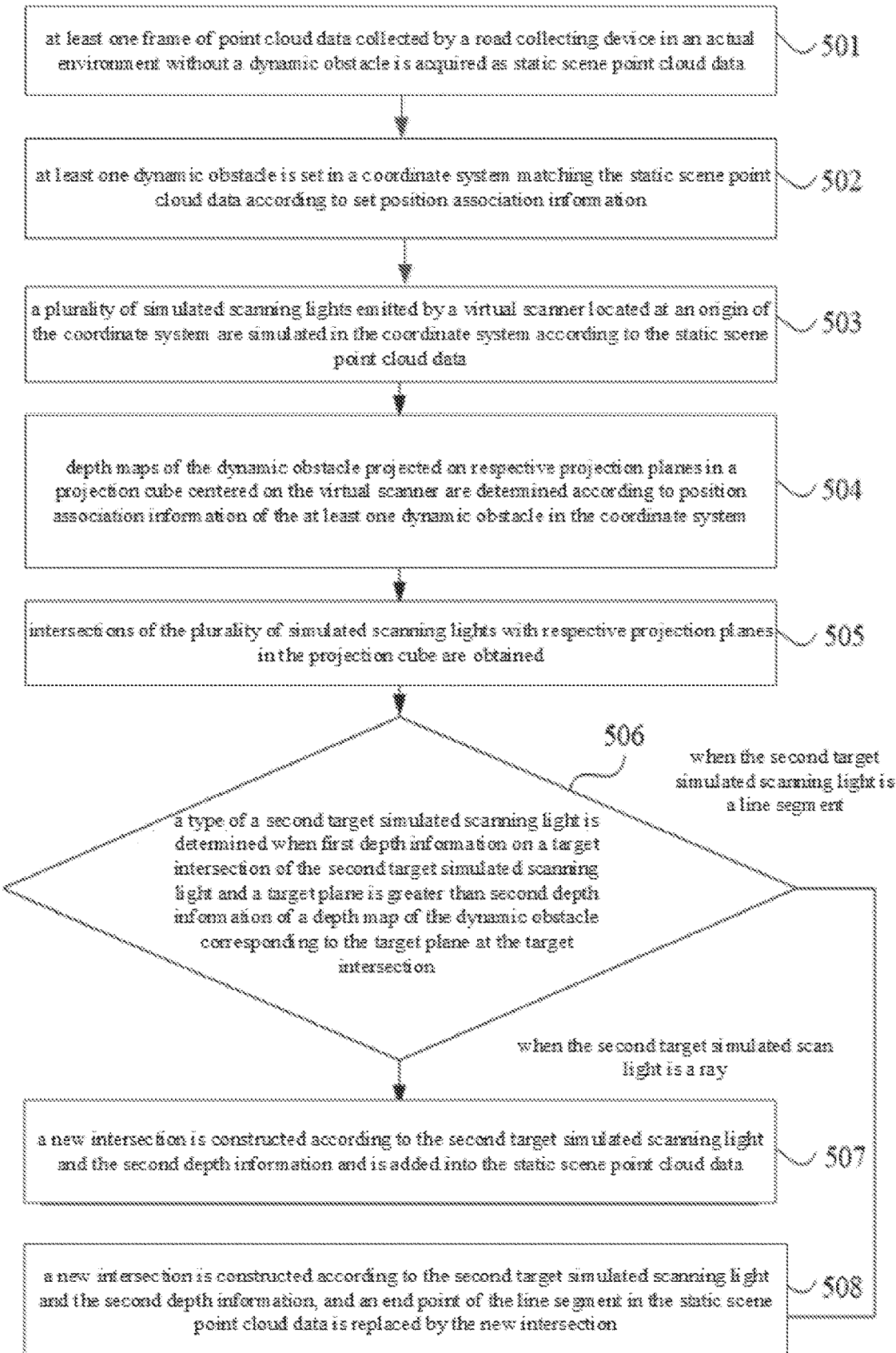
FIG. 5 is a flowchart of a method for generating simulated point cloud data according to Embodiment 5 of the present disclosure.

FIG. 5 is a flowchart of a method for generating simulated point cloud data according to Embodiment 5 of the present disclosure. In this embodiment, updating the static scene point cloud data according to intersections of the plurality of simulated scanning lights and the at least one dynamic obstacle to obtain the simulated point cloud data including point cloud data of the dynamic obstacle may include: determining, according to position association information of the at least one dynamic obstacle in the coordinate system, depth maps of the dynamic obstacle projected on respective projection planes in a projection cube centered on the virtual scanner; obtaining intersections of the plurality of simulated scanning lights with respective projection planes in the projection cube; determining a type of a second target simulated scanning light when first depth information on a target intersection of the second target simulated scanning light and a target plane is greater than second depth information of a depth map of the dynamic obstacle corresponding to the target plane at the target intersection; when the second target simulated scan light is a ray, constructing a new intersection according to the second target simulated scanning light and the second depth information, and adding the new intersection to the static scene point cloud data; when the second target simulated scanning light is a line segment, constructing a new intersection according to the second target simulated scanning light and the second depth information, and replacing an end point of the line segment in the static scene point cloud data by the new intersection.

As shown in FIG. 5, the method specifically includes the following:

At block 501, at least one frame of point cloud data collected by a road collecting device in an actual environment without a dynamic obstacle is acquired as static scene point cloud data.

At block 502, at least one dynamic obstacle is set in a coordinate system matching the static scene point cloud data according to set position association information.

At block 503, a plurality of simulated scanning lights emitted by a virtual scanner located at an origin of the coordinate system are simulated in the coordinate system according to the static scene point cloud data.

At block 504, depth maps of the dynamic obstacle projected on respective projection planes in a projection cube centered on the virtual scanner are determined according to position association information of the at least one dynamic obstacle in the coordinate system.

The projection cube is built around the virtual scanner. The six faces of the projected cube are the projection planes. The entire scene is projected onto the six projection planes of the projection cube to form six depth maps. Each pixel value of the depth map represents the distance of the object from the projection plane.

Since the six projection planes of the projected cube may contain all the directions emitted from the center of the projected cube, the corresponding six depth maps may contain depth information for all objects visible to the virtual scanner in the scene. The depth information is the distance information of the object to the projection plane.

The position of the at least one dynamic obstacle may be determined according to the position association information of the at least one dynamic obstacle in the coordinate system, and the depth map of the dynamic obstacle is determined according to the positions of the dynamic obstacle in the six depth maps.

At block 505, intersections of the plurality of simulated scanning lights with respective projection planes in the projection cube are obtained.

The starting point of the simulated scanning light is a virtual scanner located at the origin of the coordinate system. Any one of the simulated scan rays will necessarily intersect a face of the projected cube. For the intersection of a simulated scanning ray and the projection plane, the corresponding depth information may be directly found on the corresponding depth map.

At block 506, a type of a second target simulated scanning light is determined when first depth information on a target intersection of the second target simulated scanning light and a target plane is greater than second depth information of a depth map of the dynamic obstacle corresponding to the target plane at the target intersection; and when the second target simulated scan light is a ray, act in block 507 is performed; when the second target simulated scanning light is a line segment, act in block 508 is performed.

The first depth information is distance information of the target intersection point to the target plane. The second depth information is distance information of the dynamic obstacle to the target plane under the target intersection.

The second target simulated scanning light is a simulated scanning ray generated from the static scene point cloud data. When the first depth information of the target intersection between the second target simulated scanning light and the target plane is greater than the second depth information of the depth map of the dynamic obstacle corresponding to the target plane at the target intersection, it means that the dynamic obstacle shields the static scene at the target intersection, and it is necessary to determine how to update the static scene point cloud data according to the shielding relationship. Therefore, the type of the second target simulated scanning light is determined. The type of second target simulated scanning light includes a line segment and a ray.

At block 507, a new intersection is constructed according to the second target simulated scanning light and the second depth information and is added into the static scene point cloud data.

When the second target simulated scanning light is a ray, the second target simulated scanning light is a supplemental light that does not encounter an obstacle during transmission. When the first depth information of the target intersection between the second target simulated scanning light and the target plane is greater than the second depth information of the depth map of the dynamic obstacle corresponding to the target plane at the target intersection, it means that a new shielding relationship is formed after the dynamic obstacle is added, such that the new intersection is built according to the second target simulated scanning light and the second depth information, and the new intersection is added into the static scene point cloud, so as to supplement the shielding relationship between the dynamic obstacle and the static scene.

At block 508, a new intersection is constructed according to the second target simulated scanning light and the second depth information, and an end point of the line segment in the static scene point cloud data is replaced by the new intersection.

When the second target simulated scanning ray is a line segment, the second target simulated scanning ray is a simulated scanning light obtained by respectively connecting each point in the static scene point cloud data and the origin in the coordinate system. When the first depth information of the target intersection between the second target simulated scanning light and the target plane is greater than a second depth information of the depth map of the dynamic obstacle corresponding to the target plane at the target intersection point, it means that the dynamic obstacle shields the static scene. Then, according to the second target simulated scanning light and the second depth information, a new intersection point is constructed, and the new intersection point is used to replace the end point of the line segment in the static scene point cloud data, thereby updating the shielding relationship between the dynamic obstacle and the static scene.

With the method for generating simulated point cloud data provided in embodiments of the present disclosure, depth maps of the dynamic obstacle projected on respective projection planes in a projection cube centered on the virtual scanner are determined according to position association information of the at least one dynamic obstacle in the coordinate system, and it may be determined whether to update the static scene point cloud data according to the first depth information on a target intersection of the second target simulated scanning light and a target plane is greater than second depth information of a depth map of the dynamic obstacle corresponding to the target plane at the target intersection. According to the type of the second target simulated scanning light, the manner of updating the static scene point cloud data may be determined, the shielding relationship between the dynamic obstacle and the static scene according to the depth information, and the static scene point cloud data may be updated according to the shielding relationship.

Embodiment 6

Figure 6:
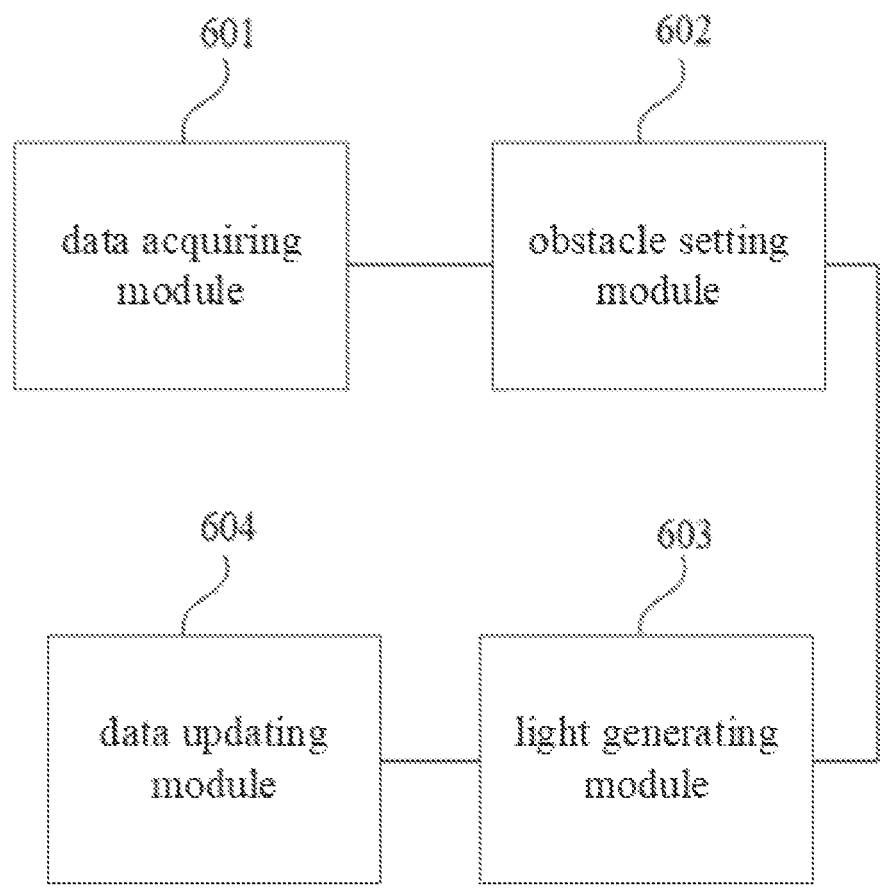
FIG. 6 is a schematic structural diagram of an apparatus for generating simulated point cloud data according to Embodiment 6 of the present disclosure.

FIG. 6 is a schematic structural diagram of an apparatus for generating simulated point cloud data according to Embodiment 6 of the present disclosure. As shown in FIG. 6, the apparatus may be configured in a computer device, including: a data acquiring module 601 and an obstacle setting module 602, a light generating module 603 and a data updating module 604.

The data acquiring module 601 is configured to acquire at least one frame of point cloud data collected by a road collecting device in an actual environment without a dynamic obstacle as static scene point cloud data. The obstacle setting module 602 is configured to set, according to set position association information, at least one dynamic obstacle in a coordinate system matching the static scene point cloud data. The light generating module 603 is configured to simulate in the coordinate system, according to the static scene point cloud data, a plurality of simulated scanning lights emitted by a virtual scanner located at an origin of the coordinate system. The data updating module 604 is configured to update the static scene point cloud data according to intersections of the plurality of simulated scanning lights and the at least one dynamic obstacle to obtain the simulated point cloud data comprising point cloud data of the dynamic obstacle.

The embodiment of the present disclosure provides an apparatus for generating simulated point cloud data, in which point cloud data collected by a road collecting device in an actual environment without a dynamic obstacle may be determined as static scene point cloud data, and at least one dynamic obstacle is set in a coordinate system matching the static scene point cloud data according to set position association information. After that, a plurality of simulated scanning lights emitted by a virtual scanner located at an origin of the coordinate system are simulated in the coordinate system, and the static scene point cloud data may be updated according to intersections of the plurality of simulated scanning lights and the at least one dynamic obstacle to obtain the simulated point cloud data including point cloud data of the dynamic obstacle. Therefore, a three-dimension scene map does not need to be generated to perform the point cloud data simulation, thereby reducing a cost and difficulty of the point cloud data simulation.

On the basis of the foregoing embodiments, the light generating module 603 may include: a light generating unit configured to connect the origin of the coordinate system to each point in the static scene point cloud data respectively to obtain a plurality of line segments as the plurality of simulated scanning lights.

On the basis of the above embodiments, the light generating module 603 may include: an actual light generating unit, configured to connect the origin of the coordinate system to each point in the static scene point cloud data respectively to obtain a plurality of line segments as actual scanning lights; an ideal light generating unit, configured to simulate actual working parameters of the virtual scanner, and generate a plurality of rays starting from the origin as ideal scanning lights; a light comparing unit, configured to compare, in the coordinate system, each of the ideal scanning lights with each of the actual scanning lights separately; a light deleting unit, configured to delete an ideal scanning light with an angle between the ideal scanning light and an actual scanning light that is less than or equal to a first angle threshold; and a light combining unit, configured to determine a combination of remaining ideal scanning lights and the actual scanning lights as the plurality of simulated scanning lights.

On the basis of the foregoing embodiments, the data updating module 604 may include: a distance value acquiring unit, configured to obtain a distance value between the origin of the coordinate system and an intersection of a first target simulated scanning light and a dynamic obstacle when the first target simulated scanning light is intersected with the dynamic obstacle; an intersection adding unit, configured to add the intersection to the static scene point cloud data directly when the first target simulated scanning light is a ray; an intersection replacement unit, configured to compare, when the first target simulated scanning light is a line segment, a length of the line segment with the distance value, and replacing an end point of the line segment in the static scene point cloud data by the intersection when the distance value is smaller than the length of the line segment.

On the basis of the foregoing embodiments, the data updating module 604 may include: a depth map determining unit, configured to determine, according to position association information of the at least one dynamic obstacle in the coordinate system, depth maps of the dynamic obstacle projected on respective projection planes in a projection cube centered on the virtual scanner; an intersection obtaining unit, configured to obtain intersections of the plurality of simulated scanning lights with respective projection planes in the projection cube; and a ray type determining unit, configured to determine a type of a second target simulated scanning light when first depth information on a target intersection of the second target simulated scanning light and a target plane is greater than second depth information of a depth map of the dynamic obstacle corresponding to the target plane at the target intersection; the first intersection construction unit, configured to construct, when the second target simulated scan light is a ray, a new intersection according to the second target simulated scanning light and the second depth information, and add the new intersection to the static scene point cloud data; and a second intersection construction unit, configured to constructing, when the second target simulated scanning light is a line segment, a new intersection according to the second target simulated scanning light and the second depth information, and replace an end point of the line segment in the static scene point cloud data by the new intersection.

Based on the foregoing embodiments, the position association information may include: position information and orientation information.

Based on the foregoing embodiments, the method further includes: a data processing module, configured to add a set noise to the simulated point cloud data, and/or, delete point cloud data corresponding to the dynamic obstacle according to a set ratio.

The apparatus for generating simulated point cloud data provided by the embodiments of the present disclosure may be configured to execute the method for generating simulated point cloud data provided in any embodiment of the present disclosure, and has a function module and a beneficial effect corresponding to the execution method.

Embodiment 7

Figure 7:
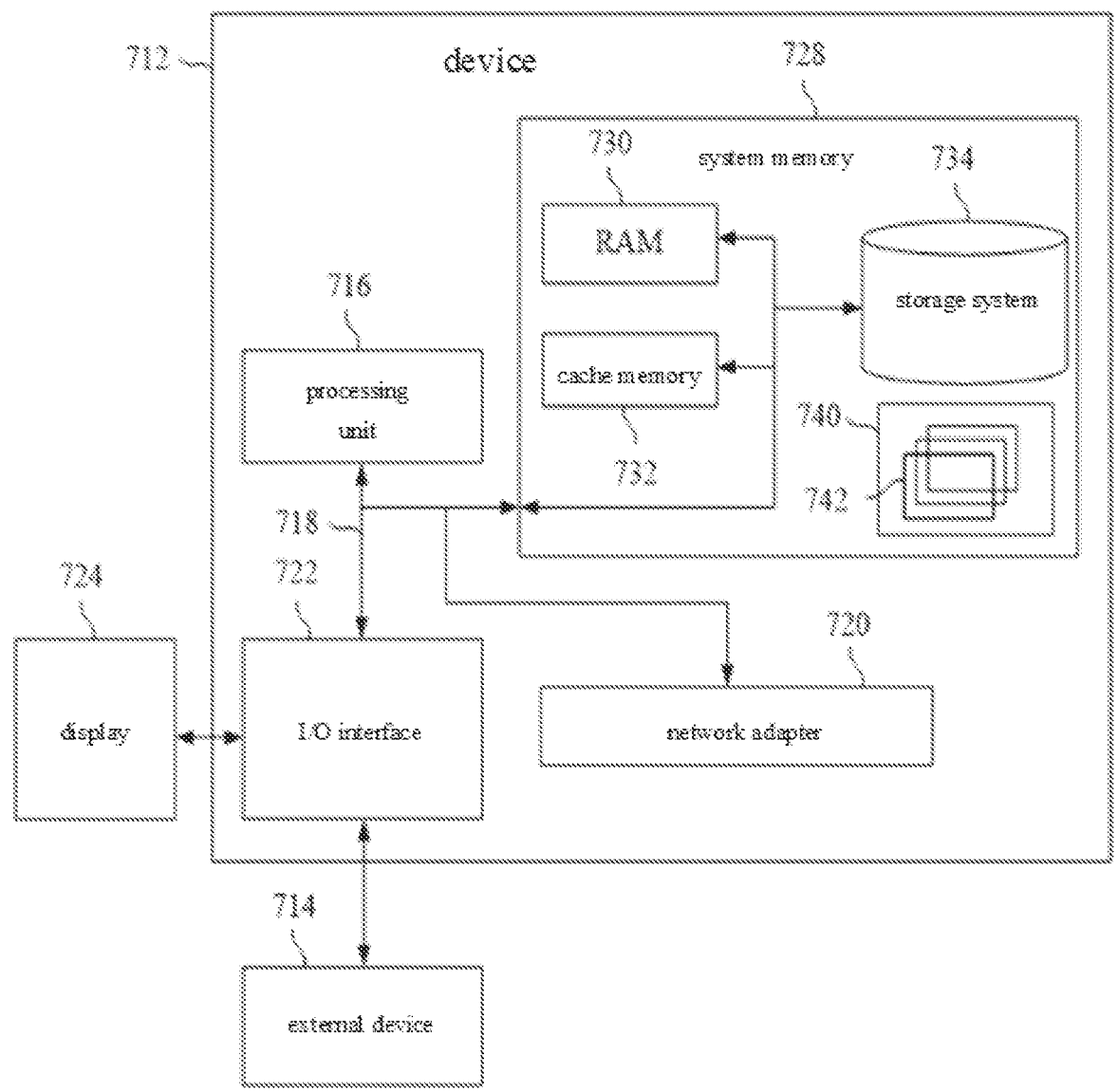
FIG. 7 is a schematic structural diagram of a device according to Embodiment 7 of the present disclosure.

FIG. 7 is a schematic structural diagram of a device according to Embodiment 7 of the present disclosure. FIG. 7 shows a block diagram of an exemplary device 712 suitable for use in implementing embodiments of the present disclosure. The device 712 shown in FIG. 7 is merely an example and should not impose any limitation on the function and scope of use of the embodiments of the present disclosure.

As shown in FIG. 7, the device 712 is embodied in a form of a general purpose computing device. Components of device 712 may include, but are not limited to, one or more processors or processing units 716, a system memory 728, and a bus 718 that connects different system components including the system memory 728 and the processing unit 716.

The bus 718 represents one or more of several types of bus structures, including a memory bus or a memory controller, a peripheral bus, a graphics acceleration port, a processor, or a local bus using any of a variety of bus structures. For example, these structures include, but are not limited to, an Industry Standard Architecture (ISA) bus, a Micro Channel Architecture (MAC) bus, an Enhanced ISA Bus, a Video Electronics Standards Association (VESA) local bus, and peripheral component interconnects (PCI) bus.

The device 712 typically includes a variety of computer system readable mediums. These media may be any available medium that may be accessed by device 712, including volatile and non-volatile medium, removable and non-removable medium.

The system memory 728 can include computer system readable medium in the form of volatile memory, such as random access memory (RAM) 730 and/or cache memory 732. Device 712 can further include other removable/non-removable, volatile/non-volatile computer system storage medium. By way of example only, the storage system 734 may be used to read and write non-removable, non-volatile magnetic medium (not shown in FIG. 7, commonly referred to as a "hard disk drive"). Although not shown in FIG. 7, a disk drive for reading and writing to a removable non-volatile disk (such as a "floppy disk"), and a removable non-volatile disk (such as a CD-ROM, DVD-ROM or other optical medium) may be provided. In these cases, each drive may be coupled to bus 718 via one or more data medium interfaces. The memory 728 can include at least one program product having a set (e.g., at least one) of program modules configured to perform the functions of various embodiments of the present disclosure.

The program/utility 740 having a set (at least one) of program modules 742, which may be stored, for example, in memory 728, such program modules 742 include, but are not limited to, an operating system, one or more applications, other programs modules and program data, each of these examples or some combination may include an implementation of a network environment. Program module 742 typically performs the functions and/or methods of the described embodiments of the present disclosure.

The device 712 can also be in communication with one or more external devices 714 (e.g., a keyboard, pointing device, display 724, etc.), and can also communicate with one or more devices that enable a user to interact with the device 712, and/or the device 712 can communicate with any device (e.g., network card, modem, etc.) that is in communication with one or more other computing devices. This communication can take place via an input/output (I/O) interface 722. Also, the device 712 can also communicate with one or more networks (e.g., a local area network (LAN), a wide area network (WAN), and/or a public network, such as the Internet) through network adapter 720. As shown, network adapter 720 communicates with other modules of device 712 via bus 718. It should be understood that although not shown in FIG. 7, other hardware and/or software modules may be utilized in connection with device 712, including but not limited to: microcode, device drivers, redundant processing units, external disk drive arrays, RAID systems, tape drives, and data backup storage systems, etc.

The device 712 may be a type of terminal device. The processing unit 716 of the device 712 executes various functions and data processing by executing a program stored in the system memory 728, for example, a method for generating simulated point cloud data provided by an embodiment of the present disclosure. The method may include: acquiring at least one frame of point cloud data collected by a road collecting device in an actual environment without a dynamic obstacle as static scene point cloud data; setting, according to set position association information, at least one dynamic obstacle in a coordinate system matching the static scene point cloud data; simulating in the coordinate system, according to the static scene point cloud data, a plurality of simulated scanning lights emitted by a virtual scanner located at an origin of the coordinate system; and updating the static scene point cloud data according to intersections of the plurality of simulated scanning lights and the at least one dynamic obstacle to obtain the simulated point cloud data comprising point cloud data of the dynamic obstacle.

Embodiment 8

The eighth embodiment of the present disclosure further provides a computer readable storage medium, on which a computer program is stored, which is executed by the processor to implement a method for generating simulated point cloud data according to an embodiment of the present disclosure. The method may include: acquiring at least one frame of point cloud data collected by a road collecting device in an actual environment without a dynamic obstacle as static scene point cloud data; setting, according to set position association information, at least one dynamic obstacle in a coordinate system matching the static scene point cloud data; simulating in the coordinate system, according to the static scene point cloud data, a plurality of simulated scanning lights emitted by a virtual scanner located at an origin of the coordinate system; and updating the static scene point cloud data according to intersections of the plurality of simulated scanning lights and the at least one dynamic obstacle to obtain the simulated point cloud data comprising point cloud data of the dynamic obstacle.

The computer storage medium of the embodiments of the present disclosure may employ any combination of one or more computer readable mediums. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination of the above. More specific examples (non-exhaustive lists) of computer readable storage medium include: electrical connections having one or more wires, a portable computer disk, a hard disk, a random access memory (RAM), a read only memory (ROM), an erasable programmable read only memory (EPROM or flash memory), an optical fiber, a portable compact disk read only memory (CD-ROM), optical storage device, magnetic storage device, or any suitable combination of the foregoing. Herein, computer readable storage medium may be any tangible medium that can contain or store a program, which may be used by or in connection with an instruction execution system, apparatus or device.

A computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device.

Program code embodied on a computer readable medium may be transmitted by any suitable medium, including but not limited to wireless, wire, fiber optic cable, RF, etc., or any suitable combination of the foregoing.

Computer program code for performing the operations of the present disclosure may be written in one or more programming languages, or combinations thereof, including an object oriented programming language such as Java, Smalltalk, C++, Ruby or Go. Also included are conventional procedural programming languages such as the "C" language or similar programming languages. The program code may execute entirely on the user's computer, partly on the user's computer, as a stand-alone software package, partly on the user's computer, partly on the remote computer, or entirely on the remote computer or server. In the case of a remote computer, the remote computer may be connected to the user's computer through any kind of network, including a local area network (LAN) or a wide area network (WAN), or may be connected to an external computer (e.g., using an Internet service provider) Internet connection).

It should be noted that the above are merely the preferred embodiments of the present disclosure and the technical principles applied thereto. Those skilled in the art will appreciate that the present disclosure is not limited to the specific embodiments described herein, and that various modifications, changes and substitutions may be made without departing from the scope of the invention. Therefore, the present disclosure has been described in detail by the above embodiments, but the present disclosure is not limited to the above embodiments, and other equivalent embodiments may be included without departing from the inventive concept. The scope is determined by the scope of the appended claims.

What is claimed is:

1. A method for generating simulated point cloud data, comprising:
    acquiring at least one frame of point cloud data collected by a road collecting device in an actual environment without a dynamic obstacle as static scene point cloud data;
    setting, according to set position association information, at least one dynamic obstacle in a coordinate system matching the static scene point cloud data;
    simulating in the coordinate system, according to the static scene point cloud data, a plurality of simulated scanning lights emitted by a virtual scanner located at an origin of the coordinate system; and
    updating the static scene point cloud data according to intersections of the plurality of simulated scanning lights and the at least one dynamic obstacle to obtain the simulated point cloud data comprising point cloud data of the dynamic obstacle, after which the method further comprises at least one of:
    adding a set noise to the simulated point cloud data, and, deleting point cloud data corresponding to the dynamic obstacle according to a set ratio.

2. The method according to claim 1, wherein, simulating in the coordinate system, according to the static scene point cloud data, the plurality of simulated scanning lights emitted by the virtual scanner located at the origin of the coordinate system comprises:

connecting the origin of the coordinate system to each point in the static scene point cloud data respectively to obtain a plurality of line segments as the plurality of simulated scanning lights.

3. The method according to claim 1, wherein, simulating in the coordinate system, according to the static scene point cloud data, the plurality of simulated scanning lights emitted by the virtual scanner located at the origin of the coordinate system comprises:
connecting the origin of the coordinate system to each point in the static scene point cloud data respectively to obtain a plurality of line segments as actual scanning lights;
simulating actual working parameters of the virtual scanner, and generating a plurality of rays starting from the origin as ideal scanning lights;
comparing, in the coordinate system, each of the ideal scanning lights with each of the actual scanning lights separately;
deleting an ideal scanning light with an angle between the ideal scanning light and an actual scanning light that is less than or equal to a first angle threshold; and
determining a combination of remaining ideal scanning lights and the actual scanning lights as the plurality of simulated scanning lights.

4. The method according to claim 1, wherein, updating the static scene point cloud data according to intersections of the plurality of simulated scanning lights and the at least one dynamic obstacle to obtain the simulated point cloud data comprising point cloud data of the dynamic obstacle comprises:
obtaining a distance value between the origin of the coordinate system and an intersection of a first target simulated scanning light and a dynamic obstacle when the first target simulated scanning light is intersected with the dynamic obstacle;
adding the intersection to the static scene point cloud data directly when the first target simulated scanning light is a ray;
when the first target simulated scanning light is a line segment, comparing a length of the line segment with the distance value, and replacing an end point of the line segment in the static scene point cloud data by the intersection when the distance value is smaller than the length of the line segment.

5. The method according to claim 1, wherein, updating the static scene point cloud data according to intersections of the plurality of simulated scanning lights and the at least one dynamic obstacle to obtain the simulated point cloud data comprising point cloud data of the dynamic obstacle comprises:
determining, according to position association information of the at least one dynamic obstacle in the coordinate system, depth maps of the dynamic obstacle projected on respective projection planes in a projection cube centered on the virtual scanner;
obtaining intersections of the plurality of simulated scanning lights with respective projection planes in the projection cube;
determining a type of a second target simulated scanning light when first depth information on a target intersection of the second target simulated scanning light and a target plane is greater than second depth information of a depth map of the dynamic obstacle corresponding to the target plane at the target intersection;
when the second target simulated scan light is a ray, constructing a new intersection according to the second target simulated scanning light and the second depth information, and adding the new intersection to the static scene point cloud data;
when the second target simulated scanning light is a line segment, constructing a new intersection according to the second target simulated scanning light and the second depth information, and replacing an end point of the line segment in the static scene point cloud data by the new intersection.

6. The method according to claim 1, wherein the position association information comprises: position information and orientation information.

7. A device for generating simulated point cloud data, comprising:
one or more processors;
a memory configured to store one or more programs, wherein when the one or more programs are executed by the one or more processors, the one or more processors are caused to implement a method for generating simulated point cloud data, in which the one or more processors are configured to:
acquire at least one frame of point cloud data collected by a road collecting device in an actual environment without a dynamic obstacle as static scene point cloud data;
set, according to set position association information, at least one dynamic obstacle in a coordinate system matching the static scene point cloud data;
simulate in the coordinate system, according to the static scene point cloud data, a plurality of simulated scanning lights emitted by a virtual scanner located at an origin of the coordinate system; and
update the static scene point cloud data according to intersections of the plurality of simulated scanning lights and the at least one dynamic obstacle to obtain the simulated point cloud data comprising point cloud data of the dynamic obstacle,
wherein the one or more processors are configured to perform at least one act of:
adding a set noise to the simulated point cloud data, and, deleting point cloud data corresponding to the dynamic obstacle according to a set ratio.

8. The device according to claim 7, wherein, the one or more processors are configured to simulate in the coordinate system, according to the static scene point cloud data, the plurality of simulated scanning lights emitted by the virtual scanner located at the origin of the coordinate system by performing an act of:
connecting the origin of the coordinate system to each point in the static scene point cloud data respectively to obtain a plurality of line segments as the plurality of simulated scanning lights.

9. The device according to claim 7, wherein, the one or more processors are configured to simulate, according to the static scene point cloud data, the plurality of simulated scanning lights emitted by the virtual scanner located at the origin of the coordinate system in the coordinate system by performing acts of:
connecting the origin of the coordinate system to each point in the static scene point cloud data respectively to obtain a plurality of line segments as actual scanning lights;
simulating actual working parameters of the virtual scanner, and generating a plurality of rays starting from the origin as ideal scanning lights;

comparing, in the coordinate system, each of the ideal scanning lights with each of the actual scanning lights separately;

deleting an ideal scanning light with an angle between the ideal scanning light and an actual scanning light that is less than or equal to a first angle threshold; and determining a combination of remaining ideal scanning lights and the actual scanning lights as the plurality of simulated scanning lights.

10. The device according to claim 7, wherein, the one or more processors are configured to update the static scene point cloud data according to intersections of the plurality of simulated scanning lights and the at least one dynamic obstacle to obtain the simulated point cloud data comprising point cloud data of the dynamic obstacle by performing acts of:

obtaining a distance value between the origin of the coordinate system and an intersection of a first target simulated scanning light and a dynamic obstacle when the first target simulated scanning light is intersected with the dynamic obstacle;

adding the intersection to the static scene point cloud data directly when the first target simulated scanning light is a ray;

when the first target simulated scanning light is a line segment, comparing a length of the line segment with the distance value, and replacing an end point of the line segment in the static scene point cloud data by the intersection when the distance value is smaller than the length of the line segment.

11. The device according to claim 7, wherein, the one or more processors are configured to update the static scene point cloud data according to intersections of the plurality of simulated scanning lights and the at least one dynamic obstacle to obtain the simulated point cloud data comprising point cloud data of the dynamic obstacle by performing acts of:

determining, according to position association information of the at least one dynamic obstacle in the coordinate system, depth maps of the dynamic obstacle projected on respective projection planes in a projection cube centered on the virtual scanner;

obtaining intersections of the plurality of simulated scanning lights with respective projection planes in the projection cube;

determining a type of a second target simulated scanning light when first depth information on a target intersection of the second target simulated scanning light and a target plane is greater than second depth information of a depth map of the dynamic obstacle corresponding to the target plane at the target intersection;

when the second target simulated scan light is a ray, constructing a new intersection according to the second target simulated scanning light and the second depth information, and adding the new intersection to the static scene point cloud data;

when the second target simulated scanning light is a line segment, constructing a new intersection according to the second target simulated scanning light and the second depth information, and replacing an end point of the line segment in the static scene point cloud data by the new intersection.

12. The device according to claim 7, wherein the position association information comprises: position information and orientation information.

13. A non-transitory computer-readable storage medium having a computer program stored thereon, the computer program being executed by a processor to implement a method for generating simulated point cloud data, comprising:

acquiring at least one frame of point cloud data collected by a road collecting device in an actual environment without a dynamic obstacle as static scene point cloud data;

setting, according to set position association information, at least one dynamic obstacle in a coordinate system matching the static scene point cloud data;

simulating in the coordinate system, according to the static scene point cloud data, a plurality of simulated scanning lights emitted by a virtual scanner located at an origin of the coordinate system; and updating the static scene point cloud data according to intersections of the plurality of simulated scanning lights and the at least one dynamic obstacle to obtain the simulated point cloud data comprising point cloud data of the dynamic obstacle, after which the method further comprises at least one of:

adding a set noise to the simulated point cloud data, and, deleting point cloud data corresponding to the dynamic obstacle according to a set ratio.

\* \* \* \* \*